(12) United States Patent
Refaat et al.

(10) Patent No.: US 12,071,161 B1
(45) Date of Patent: Aug. 27, 2024

(54) INTERVENTION BEHAVIOR PREDICTION

(71) Applicant: Waymo LLC, Mountain View, CA (US)

(72) Inventors: Khaled Refaat, Mountain View, CA (US); Stéphane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 238 days.

(21) Appl. No.: 17/858,886

(22) Filed: Jul. 6, 2022

(51) Int. Cl.
*B60W 60/00* (2020.01)
*B60W 40/04* (2006.01)
*B60W 50/00* (2006.01)

(52) U.S. Cl.
CPC ........ *B60W 60/0011* (2020.02); *B60W 40/04* (2013.01); *B60W 50/0097* (2013.01); *B60W 60/0015* (2020.02); *B60W 60/00274* (2020.02); *B60W 2554/4045* (2020.02); *B60W 2554/4046* (2020.02)

(58) Field of Classification Search
CPC ....... B60W 60/0011; B60W 60/00274; B60W 60/0015; B60W 40/04; B60W 50/0097; B60W 2554/4045; B60W 2554/4046
See application file for complete search history.

(56) References Cited

U.S. PATENT DOCUMENTS

| | | | |
|---|---|---|---|
| 2021/0019621 A1* | 1/2021 | Bhattacharyya | G06F 17/18 |
| 2021/0200221 A1* | 7/2021 | Omari | G06N 7/01 |
| 2021/0200230 A1* | 7/2021 | Ross | B60W 60/0011 |
| 2022/0126863 A1* | 4/2022 | Moustafa | G06T 9/00 |

(Continued)

FOREIGN PATENT DOCUMENTS

EP 3958181 A1 * 2/2022 ............ G06N 20/00

(Continued)

OTHER PUBLICATIONS

Zou et al.; An Overview of the Motion Prediction of Traffic Participants for Host Vehicle; Proceedings of the 38th Chinese Control Conference Jul. 27-30, 2019, Guangzhou, China; pp. 7872-7877 (Year: 2019).*

(Continued)

*Primary Examiner* — Michael J Zanelli
(74) *Attorney, Agent, or Firm* — Fish & Richardson P.C.

(57) ABSTRACT

Methods, systems, and apparatus, including computer programs encoded on a computer storage medium, for intervention behavior prediction. One of the methods includes receiving data characterizing a scene that includes a first agent and a second agent in an environment. A confounder prediction input generated from the data is processed using a confounder prediction model. A plurality of predicted conditional probability distributions is generated, wherein each predicted conditional probability distribution is conditioned on: (i) a planned intervention by the second agent, and (ii) the confounder variable belonging to a corresponding confounder class. An intervention behavior prediction for the first agent is generated based on the plurality of the predicted conditional probability distributions and the confounder distribution, wherein the intervention behavior prediction includes a probability distribution over the plurality of the possible behaviors for the first agent in reaction to the second agent performing the planned intervention.

20 Claims, 3 Drawing Sheets

(56) References Cited

U.S. PATENT DOCUMENTS

2022/0135086 A1* 5/2022 Mahjourian .... B60W 60/00272
  701/23
2023/0222336 A1* 7/2023 Redford ................. G06N 20/00
  706/20

OTHER PUBLICATIONS

Tolstaya et al.; Identifying Driver Interactions via Conditional Behavior Prediction; 2021 IEEE Intl. Conf. on Robotics and Automation (ICRA); Jun. 1, 2021 (Year: 2021).*

Khandelwal et al.; What-If Motion Prediction for Autonomous Driving; arXiv:2008.10587v1 [cs. LG] Aug. 24, 2020 (Year: 2020).*

Chen, "Designing Explainable Autonomous Driving System for Trustworthy Interaction," Dissertation submitted in partial satisfaction of the requirements for the degree of Doctor of Philosophy, University of California, Spring 2022, 162 pages.

Tang et al., "Interventional Behavior Prediction: Avoiding Overly Confident Anticipation in Interactive Prediction," CoRR, Apr. 19, 2022, arxiv.org/abs/2204.08665v1, 7 pages.

* cited by examiner

INTERVENTION BEHAVIOR PREDICTION

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions. Some autonomous vehicles can use a variety of on-board sensors and computer systems to predict nearby objects' behavior and trajectory. Predicting a road user's behavior and trajectory correctly and timely is one of the keys to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for performing intervention behavior predictions for a nearby object that can interact with an autonomous vehicle. The intervention behavior predictions predict how the nearby object would react if the autonomous vehicle follows a certain planned action or a planned intervention. Thus, the autonomous vehicle can make better control and navigation decisions by taking into consideration the intervention behavior predictions of nearby objects.

In general, one innovative aspect of the subject matter described in this specification can be embodied in methods that include the actions of receiving data characterizing a scene that includes a first agent and a second agent in an environment; processing a confounder prediction input generated from the data using a confounder prediction model, wherein the confounder prediction model is configured to receive the confounder prediction input and to process the confounder prediction input to generate a confounder distribution over a plurality of confounder classes for a confounder variable, wherein the confounder distribution includes a predicted probability value for each confounder class of the plurality of the confounder classes; generating a plurality of predicted conditional probability distributions, wherein each predicted conditional probability distribution of the plurality of the predicted conditional probability distributions is conditioned on: (i) a planned intervention by the second agent, and (ii) the confounder variable belonging to a corresponding confounder class, the generating includes: for each confounder class, processing an intervention input generated from the data characterizing the scene that includes the first agent and the second agent, the planned intervention by the second agent using a conditional behavior prediction model, and the confounder variable belonging to the corresponding confounder class, wherein the conditional behavior prediction model is configured to receive the intervention input and to process the intervention input to generate a respective predicted conditional probability distribution over a plurality of possible behaviors for the first agent; and generating an intervention behavior prediction for the first agent based on the plurality of the predicted conditional probability distributions and the confounder distribution, wherein the intervention behavior prediction includes a probability distribution over the plurality of the possible behaviors for the first agent in reaction to the second agent performing the planned intervention. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The confounder variable includes a reactivity of the first agent to the second agent, the confounder distribution includes reactivity distribution over a plurality of reactivity classes for the reactivity of the first agent to the second agent. The second agent is an autonomous vehicle, the first agent is a road-user that is in a same environment as the autonomous vehicle. The conditional behavior prediction model includes a dynamic decoder that has (i) a set of shared parameters and (ii) a respective set of class parameters for each of the plurality of the confounder classes, and wherein for each confounder class, the processing the intervention input using the conditional behavior prediction model includes: receiving an embedding input to the dynamic decoder; and processing the embedding input using (i) the set of shared parameters of the dynamic decoder, (ii) the respective set of class parameters for the confounder class, but not (iii) the respective sets of class parameters for any other classes in the plurality of the confounder classes. The actions include generating the embedding input by processing an input generated from the data characterizing the scene that includes the first agent and the second agent using an encoder. The conditional behavior prediction model includes a separate decoder for each confounder class of the plurality of the confounder classes. Generating the intervention behavior prediction for the first agent based on the plurality of the predicted conditional probability distributions and the confounder distribution includes: for each confounder class, obtaining the respective predicted conditional probability distribution that is conditioned on the confounder variable belonging to the confounder class, and computing a product of the respective predicted conditional probability distribution and the predicted probability value for the confounder class; and computing a sum of the products over the plurality of the confounder classes, wherein the sum is the intervention behavior prediction for the first agent. The actions further include obtaining a plurality of planned interventions by the second agent; for each planned intervention of the plurality of planned interventions, computing a respective intervention behavior prediction for the first agent in reaction to the second agent performing the planned intervention; and generating a planned trajectory for the second agent by comparing the intervention behavior predictions corresponding to the plurality of planned interventions. The actions further include generating a planned trajectory for the second agent using the intervention behavior prediction for the first agent. The confounder variable includes a characteristic variable of the first agent. The confounder variable includes a characteristic variable of the environment. The confounder variable includes a respective characteristic variable of one or more other agents in the environment.

Particular embodiments of the subject matter described in this specification can be implemented so as to realize one or more of the following advantages.

Conventionally, autonomous vehicles have computer systems that implement an on-board behavior prediction (BP) model to predict nearby agents' behavior or trajectory. The agents can be other road users, e.g., vehicles, cyclists, pedestrians, and so on. The autonomous vehicles can have computer systems that implement a conditional behavior prediction (CBP) to predict nearby agents' behavior or trajectory conditioned on a planned action of the autonomous vehicles. However, the CBP may not accurately reflect an agent's possible behaviors in reaction to the autonomous vehicle performing a planned action. An agent's behavior may have been caused by other factors rather than the autonomous vehicle's planned action. For example, an agent may determine to slow down at a red traffic light and the autonomous vehicle's lane changing plan would not cause a change to the agent's behavior.

This specification describes an intervention behavior prediction (IBP) technique to predict how nearby agents would react if the autonomous vehicle follows a certain planned action or a planned intervention. Rather than calculating the CBP, the IBP technique can generate accurate intervention behavior predictions by taking into account one or more confounder variables that affect an agent's decision making. For example, an agent's reactivity, awareness, intent, or driving style could affect the agent's behavior in response to the autonomous vehicle's planned action. In some examples, the one or more confounder variables can include a predicted future state of the environment that includes the agent and the autonomous vehicle, such as a prediction of a future state of a traffic light. The IBP technique can predict a distribution over the one or more confounder variables, and the IBP technique can combine the prediction over the confounder variables with predictions of the agent's behavior conditioned on the confounder variables and the autonomous vehicle's planned action or planned intervention. In some implementations, the IBP can include a reactivity prediction model that can dynamically predict an agent's reactivity distribution over multiple reactivity classes over a period of time. By generating the intervention behavior prediction using the reactivity probability distribution rather than assigning a reactivity class to a given agent, the system can take into consideration various possible reactivities, improving the robustness of the prediction and making the IBP suitable for the safety critical nature of autonomous driving.

In some implementations, the IBP can include a computationally efficient dynamic decoder that has low latency and saves the memory consumption by using dynamic parameters set according to each reactivity class. When dynamic biases are used in the slice parameters of the dynamic decoder, the system only needs to add an additional bias for the identified reactivity class. When dynamic weights are used in the slice parameters of the dynamic decoder, the system can pre-compute a weight vector for the identified reactivity class, e.g., by computing a sum of the shared weights and the weights for the reactivity class. During inference onboard the autonomous vehicle, instead of having the overhead of an additional matrix multiplication, the system can select the pre-computed weight vector and can perform a single matrix multiplication. The dynamic decoder can require less memory on-board the autonomous vehicle than having separate decoders for the reactivity classes. The IBP can be efficiently computed as a single batch over the reactivity classes. Based on the IBP, the planning subsystem of an autonomous vehicle can make safe and efficient control and navigation decisions for the autonomous vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use an intervention behavior prediction model to generate intervention behavior predictions to predict how a nearby agent would react if the autonomous vehicle follows a certain planned action or a planned intervention.

Figure 1:
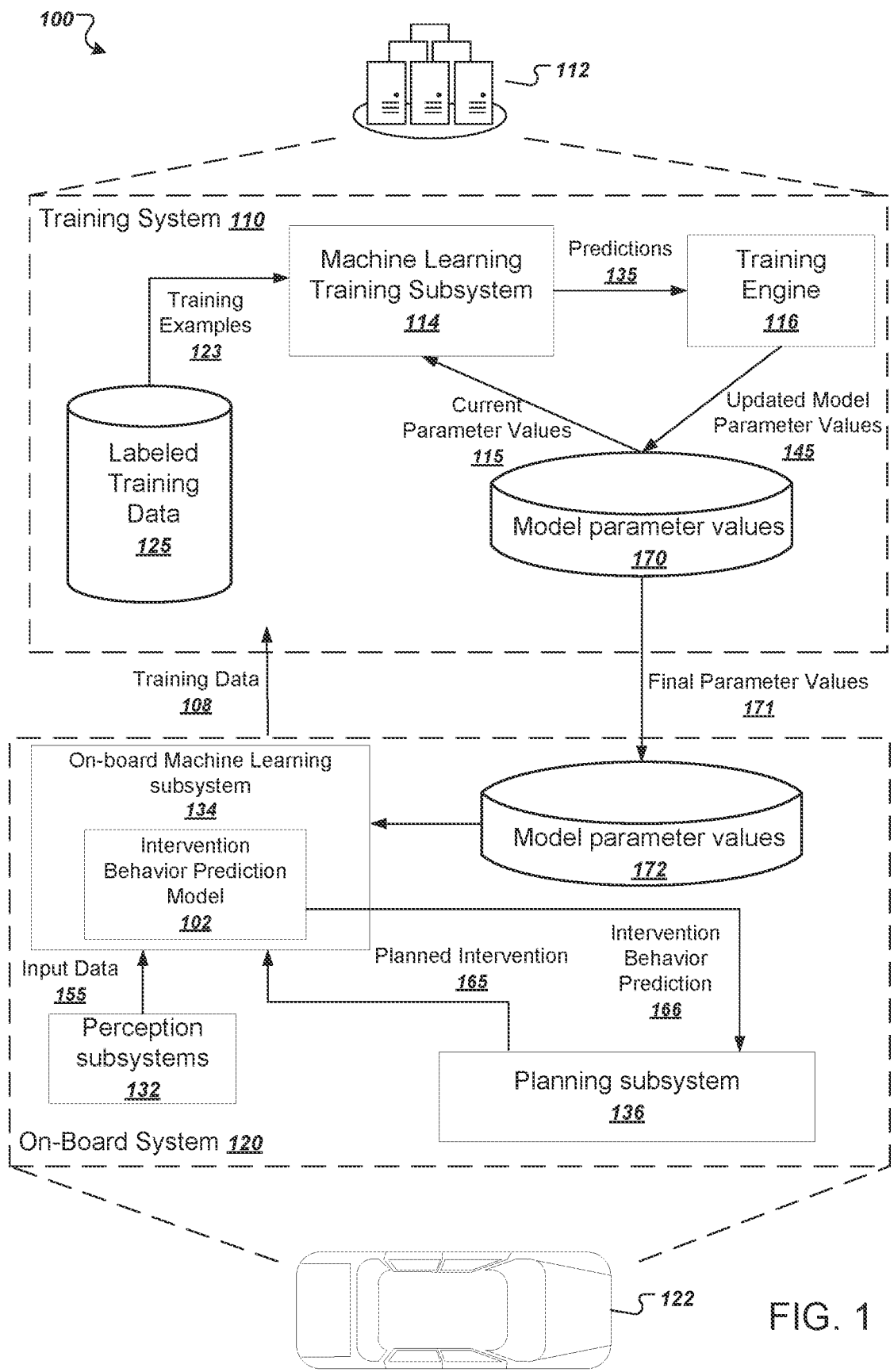
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. In some cases, the vehicle 122 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 122 can autonomously apply the brakes if a prediction indicates that a human driver is about to collide with another vehicle. As another example, the vehicle 122 can have an advanced driver assistance system (ADAS) that assists a human driver of the vehicle 122 in driving the vehicle 122 by detecting potentially unsafe situations and alerting the human driver or otherwise responding to the unsafe situation. As a particular example, the vehicle 122 can alert the driver of the vehicle 122 or take an autonomous driving action when an obstacle is detected, when the vehicle departs from a driving lane, or when an object is detected in a blind spot of the human driver.

The on-board system 120 includes one or more perception subsystems 132. The perception subsystems 132 can generate input data 155 characterizing a scene that includes one or more agents and the vehicle 122 in an environment. The agents can be other road users, e.g., vehicles, cyclists, pedestrians, and so on. The data characterizing the scene that includes an agent or the vehicle 122 can include object type, object attribute (e.g., child, special vehicle, and turn signal), object property (e.g., human activity, sign), object trajectory, object coordinates, object speed, object heading, and object curvature, etc. For example, the perception subsystem can include a combination of sensor components that receive reflections of electromagnetic radiation, e.g., lidar systems that detect reflections of laser light, radar systems that detect reflections of radio waves, and camera systems that detect reflections of visible light. Additionally, the perception subsystems 132 can obtain predetermined environment information, e.g., information identifying lanes, traffic signs, crosswalks, and other roadway features that can be found in a road graph or map of the environment. In some implementations, the on-board system 120 can obtain navigation history information (e.g., trajectories and speeds, headings, etc.) of the vehicle 122, e.g., from driving logs of the vehicle, and can provide the navigation history information as part of the input data 155.

Using the predetermined environment information and sensor captured information, the perception subsystems 132 can generate the input data 155 characterizing the scene that includes an agent and the vehicle 122 in the environment that can help to predict possible behaviors for the agent. For example, the data characterizing the scene that includes an agent in the environment can include an image or a video of the agent over a period of time captured by a camera sensor, point cloud data of the agent captured by a lidar sensor, road information (e.g., lanes and stop signs), locations of surrounding objects (e.g., other vehicles and pedestrians), etc.

A planning system 136 can generate autonomous driving plans for the vehicle 122 by planning one or more possible future trajectories of the vehicle 122, e.g., a safe and plausible trajectory. The planning system 136 can receive perception information generated from sensor data (e.g., locations of one or more agents and their predicted behaviors) and can generate the one or more possible future trajectories based on the perception information. The perception information can be generated from a perception subsystem 132 that implements one or more perception machine learning models. The planning system 136 can include a planning model, e.g., a machine learning model, that can be configured to generate the one or more future trajectories.

At any given time point during the operation of the vehicle 122, the planning system 136 can generate candidate interventions as part of the planning of the future trajectory after the given time point. Each candidate intervention can be a planned intervention that the vehicle 122 follows. The planned intervention can include a planned action the vehicle 122 would follow in the future, a trajectory the vehicle 122 would follow in the future, a planned geometry of the vehicle 122, a planned speed of the vehicle 122, or a combination of the above. For example, a planned intervention can include an action of "slowing down" or "turning left". As another example, a planned intervention can include the trajectory of the vehicle 122 over a future period of time, e.g., over 3 seconds, 5 seconds, or 10 seconds.

The planning system 136 can provide the candidate interventions, e.g., a planned intervention 165, to a prediction model, in order to query how other agents in the scene would react if the vehicle 122 follows the candidate interventions. In some implementations, the planning subsystem 136 can send multiple queries requesting a respective intervention behavior prediction for an agent in reaction to multiple possible planned interventions or planned actions to be performed by the vehicle 122. The prediction model can process each query and provide respective intervention behavior predictions 166 in reaction to the vehicle performing each planned intervention.

The perception subsystems 132 provide input data 155 to an on-board machine learning subsystem 134. The on-board machine learning subsystem 134 is an machine learning model inference subsystem that deploys a trained machine learning model on-board the vehicle 122. The on-board machine learning subsystem 134 implements operations of an intervention behavior prediction (IBP) model 102. The IBP model 102 can process the input data 155 to generate an intervention behavior prediction for a nearby agent, i.e., how the nearby agent would react if the autonomous vehicle 122 follows a certain planned intervention 165.

A nearby agent or an agent in a "vicinity" of the vehicle 122 in an environment is an agent that is within a range of at least one of the sensors of the vehicle 122, e.g., an agent that can be sensed or measured by one or more of the sensors of the vehicle 122. A planned intervention 165 of the vehicle 122 can be an action, a trajectory, a geometry, or a speed that the vehicle plans to execute over a future period of time. The planned intervention 165 can be generated by a planning subsystem 136 of the on-board system 120. For example, the planned intervention 165 can include one of the following: driving forward, turning left, turning right, stopping, changing lanes, etc. As another example, the planned intervention 165 can include trajectories of the vehicle 122 doing different maneuvers: driving forward, turning left or right, stopping, changing lanes, and/or generally representing different variations in an autonomous driving path geometry and trajectory speed profile for executing these different maneuvers.

For example, the IBP model 102 can receive input data 155 that characterizes a scene that includes an agent and the vehicle 122 in an environment and the navigation history of the agent and navigation history of the vehicle 122. The IBP model 102 can receive a query requesting a predicted behavior distribution for the agent if the vehicle 122 performs a planned intervention 165, e.g., a yielding action, to the agent. The IBP model 102 can process the input data 155 to generate predicted probability distribution over a plurality of possible behaviors for the agent in reaction to the vehicle 122 performing the yielding action. Thus, the vehicle 122 can make better control and navigation decisions by taking into consideration the predicted behavior distribution for the agent.

Conventionally, autonomous vehicles can have computer systems that implement a conditional behavior prediction (CBP) to predict nearby agents' behavior or trajectory conditioned on a planned action of the autonomous vehicles. For example, the CBP can be formulated as Pr(Agent prediction|planned action), where Pr represents the probability of the agent prediction given the planned action. However, the CBP may not accurately reflect an agent's possible behaviors in reaction to the autonomous vehicle performing a planned action. An agent's behavior may have been caused by other factors rather than the autonomous vehicle's planned action. For example, an agent may determine to slow down due to a red traffic light and not due to the autonomous vehicle's lane changing plan. However, a CBP may still indicate that the agent would be more likely to slow down if the autonomous vehicle follows the lane changing plan, because the CBP only captures an association between two events, without questioning the causality relationship between the two events.

Instead of performing a CBP, the IBP model 102 can generate accurate intervention behavior predictions 166 by taking into account confounder variables that affect an agent's decision making. In general, a confounder variable is a variable whose presence affects the variables being studied so that the results do not reflect the actual relationship between the variables. In intervention behavior prediction, a confounder variable is a characteristic variable of a nearby agent, a characteristic variable of the environment (e.g., a state of a traffic light), or both, that affects the possible behaviors of the agent and the possible behaviors of the autonomous vehicle. Thus, the confounder variable could impact the agent's reaction to the planned intervention of the vehicle 122, i.e., affects how the agent reacts to planned interventions. The confounder variable can be correlated with the executed trajectories of the autonomous vehicle (e.g., historical driving data of the autonomous vehicle). The confounder variable can include multiple classes predefined by the system 100.

Examples of a confounder variable include an agent's reactivity (e.g., levels of reactivity to an intervention), awareness (e.g., levels of awareness to an intervention), intent (e.g., an agent's navigation goal or a long-term plan), or driving style (e.g., means of a judgment expressed by the driver on a scale ranged from aggressive to cautious). In some implementations, examples of a confounder variable can include a predicted future state of the environment that includes the agent and the autonomous vehicle. For example, a confounder variable can include as a prediction of a future state of a traffic light, or future states of multiple traffic lights. The system can generate a prediction of a future state of a traffic light, e.g., whether the traffic light will stay red or stay green over a future period of time (e.g., 10 seconds). The system can generate a behavior prediction for the agent conditioned on the predicted future state of the traffic light. In some implementations, the confounder variable can include both predicted state of the agent (e.g., the agent's reactivity, awareness, intent, or driving style) and predicted future state of the environment.

The reactivity variable measures how strongly the agent changes its behavior in response to the behavior of the autonomous vehicle. The reactivity variable can include multiple possible levels or classes, e.g., no reactivity, weak reactivity, strong reactivity, and full reactivity. At any given time point, the reactivity variable can be at a particular level or belong to a particular class.

The awareness variable measures how strongly the agent is aware of or is paying attention to the behavior of the autonomous vehicle. The awareness variable can include multiple possible levels or classes, e.g., no awareness, weak awareness, strong awareness, and full awareness. At any given time point, the awareness variable can be at a particular level or belong to a particular class.

The intent variable indicates the agent's short-term goal or long-term plan. The intent variable can include a planned action for the agent, or a planned trajectory for the agent. For example, the intent variable can include an agent's navigation plan of "changing to the left lane", "turning left", or "moving forward".

The driving style variable measures the means of a judgment expressed by a driver on a scale ranging from aggressive to cautious. The driving style variable can include multiple possible levels or classes, e.g., extremely aggressive, aggressive, cautious, and extremely cautious. At any given time point, the driving style variable can be at a particular level or belong to a particular class.

The confounder variable can be a single characteristic variable, e.g., reactivity of the agent. The confounder variable can be a multi-dimensional variable that includes two or more characteristics, e.g., reactivity and intent, or awareness and driving style.

The IBP model 102 can include a confounder prediction model and a conditional behavior prediction model to take into account confounder variables that affect an agent's decision making. The confounder prediction model can be configured to receive a confounder prediction input (e.g., the input data 155) and to process the confounder prediction input to generate a confounder distribution over a plurality of confounder classes for a confounder variable. The confounder distribution can include a predicted probability value for each confounder class of the plurality of the confounder classes.

For example, the confounder prediction model can generate a confounder probability distribution Pr(ConVar=r) over r=1, ..., M. Here, "ConVar" is a confounder variable affecting the agent's decision making and the autonomous vehicle's decision making. The confounder variable can have M possible classes. The Pr(ConVar=r) is a predicted probability value for a class r.

The conditional behavior prediction model is configured to receive an intervention input and to process the intervention input to generate a respective predicted conditional probability distribution over a plurality of possible behaviors for the agent. The intervention input can be generated from: (i) the data characterizing a scene that includes the agent and the vehicle 122 (e.g., the input data 155), (ii) a planned intervention 165 by the vehicle 122, and (iii) a confounder variable belonging to a corresponding confounder class. Each conditional probability distribution is conditioned on: (i) the planned intervention by the vehicle 122, and (ii) the confounder variable belonging to a corresponding confounder class.

The conditional behavior prediction model can generate a prediction of a conditional probability distribution Pr(Agent Prediction|intervention, ConVar=r), including a respective predicted conditional probability distribution over a plurality of possible behaviors for the agent, e.g., Pr(Agent Prediction), conditioned on: (i) a planned intervention performed by the vehicle, e.g., the intervention, and (ii) a confounder variable belonging to a corresponding class, e.g., ConVar=r.

Based on the predicted conditional probability distributions and the confounder probability distribution, the IBP model 102 can be configured to generate an intervention behavior prediction 166. The intervention behavior prediction 166 includes a probability distribution over the plurality of the possible behaviors for the agent in reaction to the vehicle 122 performing the planned intervention. The IBP model can be configured to compute, for each confounder class, a product of a respective predicted conditional probability distribution and the predicted probability value of the confounder class. Then the IBP model can be configured to compute a sum of the products over the plurality of the confounder classes, and the sum is the intervention behavior prediction 166.

For example, the intervention behavior prediction 166 can be formulated as the following:

$$Pr(\text{Agent Prediction}|Do(\text{intervention})) = \Sigma_r Pr(\text{Agent Prediction}|Do(\text{intervention}), ConVar=r) Pr(ConVar=r). \quad (1)$$

Here, Pr(Agent Prediction|Do (intervention)) is the intervention behavior prediction 166.

In some implementations, the confounder variable can include a reactivity of the agent to the vehicle 122. Correspondingly, the confounder prediction model can be a reactivity prediction model. The reactivity prediction model can generate a reactivity probability distribution over a plurality of possible reactivity classes of an agent. The possible reactivity classes of the agent can be levels of reactivity to an intervention performed by the vehicle, ranging from "fully reactive" to "not reactive". The possible reactivity classes can be predetermined by the system 100.

The conditional behavior prediction model can generate, for each reactivity class, a respective predicted conditional probability distribution over a plurality of possible behaviors for the agent conditioned on: (i) a planned intervention 165 by the vehicle 122, and (ii) the reactivity of the agent belonging to a corresponding reactivity class.

The IBP model 102 can generate an intervention behavior prediction 166 for the agent based on the predicted conditional probability distributions and the reactivity probability distribution. The reactivity prediction model will be described in more detail below with reference to FIG. 2. The conditional behavior prediction model will be described in more detail below with reference to FIG. 3.

For example, the reactivity prediction model can generate a reactivity probability distribution Pr(Reactivity=r) over r=1, ..., M. Here, "Reactivity" is the confounder variable affecting the agent's decision making and the vehicle 122's decision making. The reactivity variable can have M possible reactivity classes. The Pr(Reactivity=r) is a predicted probability value for a reactivity class r.

For each Reactivity class r of the M reactivity classes, the conditional behavior prediction model can generate a prediction of a conditional probability distribution Pr(Agent Prediction intervention, Reactivity=r), including a respective predicted conditional probability distribution over a plurality of possible behaviors for the agent, e.g., Pr(Agent Prediction), conditioned on: (i) a planned intervention performed by the vehicle, e.g., the intervention, and (ii) the reactivity of the agent belonging to a corresponding reactivity class, e.g., Reactivity=r.

Based on the predicted conditional probability distributions and the reactivity probability distribution, the IBP model 102 can be configured to generate an intervention behavior prediction 166. The intervention behavior prediction 166 includes a probability distribution over the plurality of the possible behaviors for the agent in reaction to the vehicle 122 performing the planned intervention. The IBP model can be configured to compute, for each reactivity class, a product of a respective predicted conditional probability distribution and the predicted probability value of the reactivity class. Then the IBP model can be configured to compute a sum of the products over the plurality of the reactivity classes, and the sum is the intervention behavior prediction 166.

For example, the intervention behavior prediction 166 can be formulated as the following:

$$Pr(\text{Agent Prediction}|Do(\text{intervention})) = \Sigma_r Pr(\text{Agent Prediction}|Do(\text{intervention}), Reactivity=r) Pr(Reactivity=r). \quad (2)$$

Here, Pr(Agent Prediction|Do (intervention)) is the intervention behavior prediction 166.

The on-board machine learning subsystem 134 can implement the operations of a machine learning model, such as the operations of the IBP model 102 trained to make intervention behavior predictions 166 for nearby agents or agents in the vicinity of the vehicle 122. The IBP model 102 can receive (i) the input data 155 characterizing a scene that includes an agent and the vehicle 122 in an environment and (ii) a query input including a planned intervention 165 to be performed by the vehicle 122. The IBP model 102 can process the input data 155 to generate a predicted probability distribution over a plurality of possible behaviors for the agent in reaction to the vehicle 122 performing the planned intervention 165. In some implementations, the IBP model 102 can be a neural network model, or other types of machine learning models.

The intervention behavior predictions 166, i.e., the plurality of possible behaviors for the agent, can include possible trajectories of the agent over a future period of time. In some implementations, the plurality of possible behaviors for the agent can include a sequence of heat-maps over a future time period, and the sequence of heat-maps can indicate predicted locations of the agent over the future time period.

For example, the IBP model 102 can predict a probability distribution for another vehicle in the vicinity of the vehicle 122 in reaction to the vehicle 122 performing a planned intervention 165. The probability distribution of possible behaviors for the other vehicle can include: a driving forward trajectory with a probability 0.3, a lane changing trajectory with a probability 0.4, and a stopping trajectory with a probability 0.3. The sum of the probabilities is 1.0. The predicted trajectory can describe the locations and speeds of the agent at a plurality of possible future time points.

Thus, the on-board machine learning subsystem 134 includes one or more computing devices having software or hardware modules that implement the operations of the IBP model 102 according to operations of the machine model included in the IBP model 102, e.g., an architecture of the neural networks included in the IBP model 102. For example, the on-board machine learning subsystem 134 includes one or more computing devices having software or hardware modules that implement the operations of a reactivity prediction model and a conditional behavior prediction model.

In some implementations, the IBP model 102 can be a single neural network model that includes a reactivity prediction head and a conditional behavior prediction head. The IBP model 102 can include an encoder that encodes the input data 155 data characterizing scene that includes the agent and the vehicle 122 in the environment into an embedding. The reactivity prediction head can generate a predicted reactivity distribution from the embedding, and the conditional behavior prediction head can generate a predicted conditional probability distribution from the embedding.

The on-board machine learning subsystem 134 can implement the operations of each layer of the IBP model 102 by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

In some implementations, the on-board machine learning subsystem 134 can use hardware acceleration or other special-purpose computing devices to implement the operations of one or more layers of the IBP model 102 that includes a neural network model. For example, some operations of some layers may be performed by highly parallelized hardware, e.g., by a graphics processing unit or another kind of specialized computing device. In other words, not all operations of each layer need to be performed by central processing units (CPUs) of the on-board machine learning subsystem 134.

The on-board machine learning subsystem 134 processes the input data 155 to generate intervention behavior predictions 166 of a nearby agent in reaction to the vehicle 122 performing a planned intervention 165. The on-board machine learning subsystem 134 can provide the intervention behavior predictions 166 to a planning subsystem 136, e.g., as a response to a query requesting the intervention behavior prediction.

When the planning subsystem 136 receives the intervention behavior prediction 166, the planning subsystem 136 can use the intervention behavior prediction 166 to make fully-autonomous or semi-autonomous driving decisions. The planning subsystem 136 can generate a planned trajectory for the vehicle 122 using the intervention behavior prediction 166 for the nearby agent.

For example, the planning subsystem 136 can generate a fully-autonomous plan to stay in the current lane for a while based on a predicted trajectory of a nearby vehicle indicating that the vehicle is not going to yield to the autonomous vehicle 122 if the autonomous vehicle 122 performs a lane changing action. As another example, the planning subsystem 136 can generate a fully-autonomous plan to stop based on a predicted trajectory of a pedestrian indicating that the pedestrian is going to cross the road in front of the autonomous vehicle 122 if the autonomous vehicle 122 performs a stopping action.

In some implementations, the planning subsystem 136 can receive respective intervention behavior predictions 166 of an agent in reaction to the vehicle performing multiple possible planned interventions. The planning subsystem 136 can generate a planned trajectory for the vehicle 122 by comparing the multiple intervention behavior predictions 166, e.g., to find a safe trajectory to navigate around an agent.

For example, the planning subsystem 136 can receive a first intervention behavior prediction of a cyclist in reaction to a planned yielding action of the vehicle 122. The planning subsystem 136 can receive a second intervention behavior prediction of the cyclist in reaction to a planned passing action of the vehicle 122 that passes the cyclist without yielding. The planning subsystem 136 can compare the predicted behaviors of the cyclist under the two planned interventions. The second intervention behavior prediction can predict a trajectory of the cyclist that indicates the cyclist would go forward with a 60% likelihood if the vehicle 122 does not yield, e.g., maybe because the reactivity of the cyclist is slow. The first intervention behavior prediction can predict a trajectory of the cyclist that indicates the cyclist would go forward with a 70% likelihood if the vehicle 122 does yield. Therefore, the planning subsystem 136 can plan a trajectory for the vehicle to yield to the cyclist.

The on-board machine learning subsystem 134 can also use the input data 155 and the corresponding planned interventions 165 to generate training data 108. The training data 108 can be used to train the IBP model 102. The on-board system 120 can provide the training data 108 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a machine learning training subsystem 114 that can implement the operations of an IBP model 102 that is configured to generate an intervention behavior prediction for an agent in response to the vehicle 122 performing a planned intervention. In some implementations, the machine learning training subsystem 114 can implement the operations of a reactivity prediction model that is included in the IBP model 102 to generate a reactivity distribution for an agent. In some implementations, the machine learning training subsystem 114 can implement the operations of a conditional behavior prediction model that is included in the IBP model 102 to generate a predicted conditional probability distribution of possible behaviors for an agent in reaction to the vehicle 122 performs a planned intervention. The machine learning training subsystem 114 includes a plurality of computing devices having software or hardware modules that implement the respective operations of a machine learning model, e.g., respective operations of each layer of a neural network according to an architecture of the neural network.

The training IBP model generally has the same architecture and parameters as the on-board IBP model 102. However, the training system 110 need not use the same hardware to compute the operations of the IBP model 102. In other words, the training system 110 can use CPUs only, highly parallelized hardware, or some combination of these.

The machine learning training subsystem 114 can compute the operations of the IBP model, e.g., the operations of each layer of a neural network, using current parameter values 115 stored in a collection of model parameter values 170. Although illustrated as being logically separated, the model parameter values 170 and the software or hardware modules performing the operations may actually be located on the same computing device or on the same memory device.

The machine learning training subsystem 114 can receive training examples 123 as input. The training examples 123 can be labeled training data 125 that is stored in a database. Each training example includes an input that characterizes a scene that includes an agent and a vehicle in an environment as well as one or more labels that indicate a ground truth behavior of the agent in response to the vehicle performing a planned intervention.

In some implementations, the one or more labels can include ground truth labels for the reactivity of an agent to a vehicle. For example, an agent's reactivity can include M classes, where class 1 means "not reactive", and class M means "fully reactive". The training system 110 can obtain the reactivity label by inspecting what happened in the future between the agent and the vehicle 122, e.g., from a driving log of the vehicle 122. For example, the reactivity label can be determined based on whether the agent of interest reacted to the vehicle early enough, resulting in a close call, or did not react, etc. In some implementations, the reactivity label can be binary, e.g., "reactive" or "not reactive". The training examples 123, including the data characterizing a scene that includes the agent and the vehicle in an environment and the reactivity labels, can be used to train a reactivity prediction model. Training the reactivity prediction model will be described in more detail below with reference to FIG. 2.

In some implementations, the labeled training data 125 can be divided into multiple slices, and each slice of training data can correspond to a reactivity class of the plurality of reactivity classes. The IBP model 102 can include a conditional behavior prediction model that can predict probability distribution of possible behaviors of an agent conditioned on: (i) the vehicle performing a planned intervention and (ii) the reactivity of the agent belongs to a reactivity class. In some implementations, the conditional behavior prediction model can include a separate model for each reactivity class, and each separate model can be trained on a slice of the training data corresponding to the reactivity class.

In some implementations, the conditional behavior prediction model can include a dynamic decoder that can use dynamic parameters, e.g., weights and/or biases, set according to each reactivity class. The conditional behavior prediction model can be trained on the multiple slices of the training data. Training the conditional behavior prediction model will be described in more detail below with reference to FIG. 3.

The machine learning training subsystem 114 can generate, for each training example 123, error predictions 135. Each error prediction 135 represents an estimate of an error between a ground truth label of the agent and the predicted probability distribution (e.g., the predicted reactivity distribution or the predicted behavior prediction) generated by the IBP model 102 that is being trained. A training engine 116 analyzes the error predictions 135 and compares the error predictions to the labels in the training examples 123 using a loss function, e.g., a classification loss or a regression loss function. The loss function will be described in more detail below with reference to FIG. 2 and FIG. 3. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. For example, the training system 110 can provide a final set of model parameter values 171 to the IBP model 102 that runs in the on-board system 120 to generate intervention behavior predictions 166 for an agent in reaction to the vehicle performing a planned intervention 165. The training system 110 can provide the final set of model parameter values 171 by a wired or wireless connection to the on-board system 120.

Figure 2:
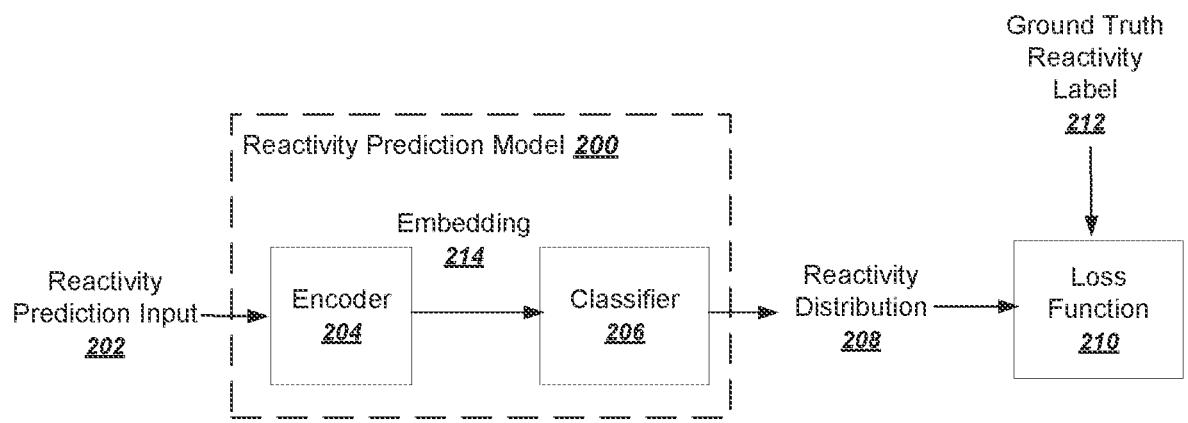
FIG. 2 illustrates an example of a reactivity prediction model.

FIG. 2 illustrates an example of a confounder prediction model, e.g., a reactivity prediction model 200.

Although FIG. 2 is illustrated for a confounder variable that includes a reactivity of an agent to a vehicle, similar techniques can be applied to another type of confounder variable or a multi-dimensional confounder variable.

The reactivity prediction model 200 can be any appropriate type of machine learning model, e.g., a neural network model or another type of machine learning model.

The reactivity prediction model 200 processes a reactivity prediction input 202 and generates a reactivity distribution 208 over a plurality of reactivity classes for the reactivity of the agent. By generating the intervention behavior prediction using the reactivity probability distribution rather than assigning a reactivity class to a given agent, the system can take into consideration various possible reactivities, improving the robustness of the prediction and making the IBP suitable for the safety critical nature of autonomous driving.

The reactivity prediction input 202 can be generated from data characterizing a scene that includes an agent and a vehicle (e.g., an autonomous vehicle) in an environment. For example, the reactivity prediction input 202 can include context information of the environment (e.g., information identifying lanes, traffic signs, crosswalks, and other roadway features that can be found in a road graph or map of the environment), a current state of the environment (e.g., a current state of nearby traffic lights), navigation history information of the agent, and navigation history information of the vehicle (e.g., an autonomous vehicle), and navigation history information of other agents (e.g., other vehicles) in the environment.

For example, the reactivity prediction input 202 can include navigation history information of the agent, the autonomous vehicle, and other vehicles in the environment. The navigation history can include a sequence of the position, velocity, orientation of the agent or the vehicle at a predetermined interval over a period of time, e.g., every 0.1 seconds in the last two seconds. The reactivity prediction input 202 can include context information of the environment, e.g., a set of roadway features within a threshold distance (e.g., 100 meters) from the agent or the autonomous vehicle. Each roadway feature can be described by a type encoded in a 1-hot vector. In some implementations, the reactivity prediction input 202 can include a sequence of waypoint positions relative to the agent's or the autonomous vehicle's location sampled at a predetermined distance interval (e.g., a 1 meter distance interval).

In some implementations, the reactivity prediction model 200 can include an encoder 204 and a classifier 206. The encoder 204 can be configured to receive the reactivity prediction input 202 and to process the reactivity prediction input 202 to generate an embedding 214 of the reactivity prediction input 202. Example architectures of the reactivity prediction model 200 (e.g., the encoder 204) can include a multilayer perceptron, a Recurrent Neural Network (RNN) such as a Long short-term memory (LSTM) neural network (Hochreiter, Sepp, and Jurgen Schmidhuber. "Long short-term memory." Neural computation 9.8 (1997): 1735-1780), a transformer neural network (Vaswani, Ashish, et al. "Attention is all you need." Advances in neural information processing systems 30 (2017)), etc. For example, the encoder 204 can include a MultiPath++ model using multi-context gating (Varadarajan, Balakrishnan, et al. "MultiPath++: Efficient Information Fusion and Trajectory Aggregation for Behavior Prediction." arXiv preprint arXiv:2111.14973 (2021)), or a convolutional neural network (Refaat, Khaled S., et al. "Agent prioritization for autonomous navigation." 2019 IEEE/RSJ International Conference on Intelligent Robots and Systems (IROS). IEEE, 2019). The embedding 214 is a numeric representation of the reactivity prediction input 202 in an embedding space, i.e., an ordered collection of a fixed number of numeric values, where the number of numeric values is equal to the dimensionality of the embedding space. For example, the embedding can be a vector of floating point or other types of numeric values. The classifier 206 can be configured to receive the embedding 214 and to process the embedding 214 to generate a reactivity distribution 208. For example, the classifier 206 can include a transformer neural network, a multilayer perceptron, or one or more fully connected layers.

The reactivity distribution 208 includes a predicted probability value for each reactivity class of the plurality of the reactivity classes. For example, for a binary reactivity variable, the reactivity distribution can include Pr(Reactive)=0.7 and Pr(Not Reactive)=0.3.

The reactivity prediction model 200 can be trained on labeled training data by a training system, e.g., the training system 110 of FIG. 1. The training data can include a plurality of training examples, and each training example can include a reactivity prediction input 202 and a ground truth reactivity label 212.

The ground truth reactivity label 212 is the agent's reactivity under the environment characterized by the reactivity prediction input 202. The ground truth reactivity label 212 of the training data can be obtained with auto-labeling or human labeling. An agent reactivity can include M classes, corresponding to different levels of reactivity. In some implementations, the training system can obtain information indicating what happened in the future between the agent and the vehicle, e.g., from a driving log of the vehicle, and determine the agent's actual behavior in the future, e.g., an actual trajectory of the agent. The system can obtain information indicating a final goal or an intent of the agent, e.g., a predicted intent generated from a vehicle intent prediction model. The system can determine the agent's ground truth reactivity label 212, e.g., the reactivity classes, by comparing the agent's intent and the agent's actual behavior in the future.

For example, the system can use a distance metric to measure a distance between a planned trajectory of the agent and an actual trajectory of the agent, and the distance can indicate whether the agent reacted to the vehicle and can be used to determine the ground truth reactivity label 212. For example, if the distance is larger than a threshold, the system can determine that the agent reacted to the vehicle because the agent's behavior is different from the plan, and the system can determine that the ground truth activity label 212 is the "Reactive" class. If the distance is smaller than the threshold, the system can determine that the agent did not react to the vehicle because the agent's behavior is not that different from the plan, and the system can determine that the ground truth activity label 212 is the "Not Reactive" class. As another example, the training system can determine whether the agent reacted immediately, reacted with some delay, or did not react, by comparing the actual behavior of the agent and the intent of the agent over a period of time.

In some implementations, the auto-labeling can be replaced or complemented by human labeling. A human labeler can subjectively measure the reactivity of the agent and determine the ground truth reactivity label 212.

The training system can train the reactivity prediction model 200 on labeled training data using supervised learning. The training system can train the reactivity prediction model 200 based on a loss function 210 that measures a difference between the predicted reactivity distribution 208 and the ground truth reactivity label 212. The loss function 210 can be a classification loss, such as a cross entropy loss. The training system generates updated model parameter values for the reactivity prediction model 200 by using an appropriate updating technique, e.g., stochastic gradient descent with backpropagation. The training system can then update the collection of model parameter values of the reactivity prediction model 200 using the updated model parameter values.

In some implementations, the reactivity prediction model 200 can be a part of a marginal behavior prediction (BP) model that predicts a marginal probability distribution of possible trajectories of the agent without conditioning on an action of the vehicle or an intervention of the vehicle. An encoder can be shared between the marginal BP model and the reactivity prediction model 200. In some implementations, the encoder can be trained using both the loss for the model 200 and the loss for the marginal BP model. In some implementations, the encoder can be pre-trained using the loss for the marginal BP model, and the parameters of the encoder can be fixed so that only the classifier 206 of the model 200 is trained using the loss for the model 200. The classifier 206 can be trained to process an embedding generated from the encoder that is shared with the marginal BP model and to generate the reactivity distribution 208 from the embedding.

Once trained, the reactivity prediction model 200 can be used to generate a prediction of the agent's reactivity distribution to the vehicle, e.g., Pr(Reactivity), over multiple time steps of a period of time. At each time step, the model 200 can generate a prediction for the agent's reactivity at the current time step. For example, suppose the system receives a query requesting the IBP at time T=1, the system can use the reactivity prediction model 200 to generate a predicted reactivity distribution Pr(Reactivity) at T=1. Because the agent's reactivity can change over time, the model 200 can accurately generate updated predictions of the agent's reactivity over time.

Figure 3:
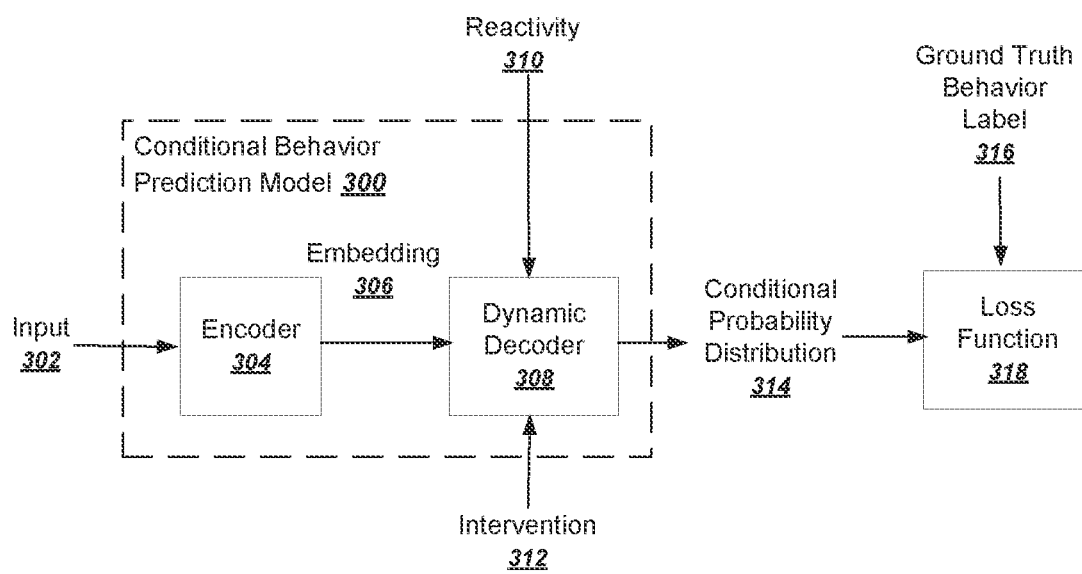
FIG. 3 illustrates an example of a conditional behavior prediction model.

FIG. 3 illustrates an example of a conditional behavior prediction model 300. Although FIG. 3 is illustrated for a confounder variable that includes a reactivity of an agent to a vehicle, similar techniques can be applied to another type of confounder variable or a multi-dimensional confounder variable.

The conditional behavior prediction model 300 can be any appropriate type of machine learning model, e.g., a neural network model, or another type of machine learning model. The conditional behavior prediction model can be used to generate a plurality of predicted conditional probability distributions 314. For each reactivity class, the conditional behavior prediction model 300 processes an input 302 and generates a predicted conditional probability distribution 314 for an agent that is conditioned on: (i) a planned intervention 312 by a vehicle, and (ii) the reactivity 310 of the agent belonging to the reactivity class, e.g., Reactivity=r.

For example, the predicted conditional probability distribution 314 can be formulated as Pr(Agent Prediction|intervention, Reactivity=r). The predicted conditional probability distribution 314 includes a predicted probability value for each behavior of a plurality of possible behaviors of the agent. Possible behaviors of the agent can include a set of future trajectories for the agent and associated probabilities. For example, the predicted conditional probability distribution 314 can be an output that defines a Gaussian Mixture Model relative to a set of anchor trajectories, which can be predetermined, learned, or generated dynamically per input 302.

The input 302 can be generated from the data characterizing a scene that includes the agent and the vehicle. For example, the input 302 can include context information of the environment (e.g., information identifying lanes, traffic signs, crosswalks, and other roadway features that can be found in a road graph or map of the environment), navigation history information of the agent, and navigation history information of the vehicle. The input 302 can include sensor data characterizing the scene that includes the agent and the vehicle in the environment. For example, the input 302 can include an image or a video captured by a camera sensor, a point cloud captured by a lidar sensor, and a road graph or map of the environment.

In some implementations, the conditional behavior prediction model 300 can include an encoder 304 and a decoder. The encoder 304 can be configured to receive the input 302 and to process the input 302 to generate an embedding 306 of the input 302. Example architectures of the conditional behavior prediction model 300 (e.g., the encoder 304) can include a multilayer perceptron, a Recurrent Neural Network (RNN) such as a Long short-term memory (LSTM) neural network (Hochreiter, Sepp, and Jurgen Schmidhuber. "Long short-term memory." Neural computation 9.8 (1997): 1735-1780), a transformer neural network (Vaswani, Ashish, et al. "Attention is all you need." Advances in neural information processing systems 30 (2017)), etc. For example, the conditional behavior prediction model 300 can include a MultiPath++ model using multi-context gating (Varadarajan, Balakrishnan, et al. "MultiPath++: Efficient Information Fusion and Trajectory Aggregation for Behavior Prediction." arXiv preprint arXiv: 2111.14973 (2021)), a PRECOG neural network (Rhinehart, Nicholas, et al. "Precog: Prediction conditioned on goals in visual multi-agent settings." Proceedings of the IEEE/CVF International Conference on Computer Vision. 2019), etc. The embedding 306 is a numeric representation of the input 302 in an embedding space, i.e., an ordered collection of a fixed number of numeric values.

The decoder can be configured to receive (i) the embedding 306, (ii) the intervention 312 that includes a planned action to be performed by the vehicle, and (iii) the reactivity 310 of the agent that belongs to a reactivity class, and to process the embedding 306 to generate the predicted conditional probability distribution 314 for the possible behaviors of the agent. In some implementations, the conditional behavior prediction model 300 can include a separate decoder for each reactivity class and each decoder can be trained to generate predicted conditional probability distribution for the corresponding reactivity class. For example, if there exists M reactivity classes, the decoder can include M separate decoders for the M reactivity classes. Each separate decoder can be trained to generate predicted conditional probability distribution for a corresponding reactivity class.

In some other implementations, the conditional behavior prediction model 300 can include a dynamic decoder 308. The dynamic decoder 308 can be configured to receive (i) the embedding 306, (ii) the intervention 312 that includes a planned action to be performed by the vehicle, and (iii) the reactivity 310 of the agent that belongs to a reactivity class, and to process the embedding 306 using dynamic parameters (e.g., dynamic weights and/or biases) set corresponding to the reactivity class 310 to generate the predicted conditional probability distribution 314 for the possible behaviors of the agent. Examples of the dynamic decoder 308 include a MultiPath++ model using multi-context gating (Varadarajan, Balakrishnan, et al. "MultiPath++: Efficient Information Fusion and Trajectory Aggregation for Behavior Prediction." arXiv preprint arXiv: 2111.14973 (2021)), transformer layers (Vaswani, Ashish, et al. "Attention is all you need." Advances in neural information processing systems 30 (2017)), etc.

In some implementations, the dynamic decoder 308 can have (i) a set of shared parameters and (ii) a respective set of class parameters for each of the plurality of the reactivity classes. For each reactivity class 310, the dynamic decoder 308 can receive the embedding 306 as an input and can process the embedding 306 using (i) the set of shared parameters of the dynamic decoder, (ii) the respective set of class parameters for the reactivity class 310, but not (iii) the respective sets of class parameters for any other classes in the plurality of the reactivity classes.

The dynamic decoder can include multiple neural network layers. One or more of the neural network layers can be a conditional neural network layer. The conditional neural network layer can be, for example, a fully connected layer, a convolutional layer, a deconvolutional layer, a recurrent layer, an attention layer, and so on. Like a conventional neural network layer, the conditional neural network layer receives a layer input and generates a layer output from the layer input. Like a conventional neural network layer, the conditional neural network layer 120 includes a set of shared parameters, e.g., weights and biases. However, unlike a conventional neural network layer, the conditional neural network layer further includes a respective set of class parameters (i.e., slice parameters) for each of the plurality of reactivity classes. For example, when there are M reactivity classes, the conditional neural network layer includes a set of slice parameters (1) for reactivity class 1, a set of slice parameters (2) for reactivity class 2, . . . and a set of slice parameters (M) for reactivity class M. The neural network system 100 can flexibly adapt to different network inputs 102 that belong to different data slices.

Generally, a neural network layer can include one or more neurons. A neuron in a neural network can be a computational unit that takes an input X and applies the following transformation: $f(WX+b)$. Here, $f$ is an activation function, e.g., a sigmoid activation function, a rectified linear unit activation function (ReLU), and so on. The W represents the weights that can be learned from training data using algorithms such as backpropagation. The b represents the bias. For example, the transformation $f(WX+b)$ can represent a conventional convolutional layer by setting most of the entries in W to be zero, except for the entries that are within the receptive field of the convolutional operation. As another example, the transformation $f(WX+b)$ can represent a conventional fully connected layer with full connections from all items in the input X.

In some implementations, the conditional neural network layer can include a set of shared parameters and a respective set of dynamic biases. The dynamic biases can include a respective set of biases for each of the plurality of slices. For example, the conditional neural network layer can include a neuron that performs operations that satisfy:

$$f(WX+b+\text{Indicator}_1 *c_1+ \ldots +\text{Indicator}_n *c_n), \quad (3)$$

wherein $f$ is an activation function, X is the layer input, W and b are the set of shared parameters. The network inputs can belong to n slices or classes. The $c_i$ is the respective set of slice parameters, e.g., biases, for each slice i, and i=1, 2, . . . , n. The $\text{Indicator}_i$ is an indicator function that equals 1 when the new input belongs to slice i, and equals 0 otherwise. Here, the reactivity 310 is the indicator function determining which weights and/or biases contribute to the computation of the dynamic decoder 308.

In some implementations, the conditional neural network layer can include a set of shared parameters and dynamic weights. The dynamic weights can include a respective set of weights for each of the plurality of slices or classes. For example, the conditional neural network layer can include a neuron that performs operations that satisfy:

$$f(WX+b+\text{Indicator}_1 W_1 X+\text{Indicator}_n W_n X), \quad (4)$$

wherein $W_i$ is the respective set of slice parameters, e.g., weights, for each slice i, and i=1, 2, . . . n.

In some implementations, the conditional neural network layer can include a set of shared parameters, dynamic weights and dynamic biases. The dynamic weights and biases can include a respective set of weights and biases for each of the plurality of slices. For example, the conditional neural network layer can include a neuron that performs operations that satisfy:

$$f(WX+b+\text{Indicator}_1(W_1X+c_1)+\ldots+\text{Indicator}_n(W_nX+c_n)), \quad (5)$$

wherein $W_i$ and $c_i$ are the respective set of slice parameters, e.g., weights and biases, for each slice i, and i=1, 2, ..., n.

The slice parameters, e.g., the dynamic biases and/or dynamic weights, of a particular slice contributes to the network output or the loss function computation during training only when the network input belongs to the particular slice, e.g., $\text{Indicator}_i=1$. Otherwise, they do not contribute to the network output computation or the loss function computation during training, e.g., $\text{Indicator}_i=0$.

In some implementations, the increase in performance by using the conditional neural network layer has minimal additional computation overhead. For any given neural network layer, the system only needs to add one or more additional biases for the identified one or more slices to which a network input belongs, when dynamic biases are used in the slice parameters. For example, for a given network input that belongs to slice i, the system only needs to include an additional bias term $c_i$ in the layer output of the conditional neural network layer.

In some implementations, when dynamic weights are used in the slice parameters of the conditional neural network layer, the system can pre-compute a weight vector for the one or more slices to which a network input can possibly belong, e.g., by computing a sum of the shared weights and the weights for one or more possible slices. During inference onboard the autonomous vehicle, instead of having the overhead of an additional matrix multiplication, the system can select the pre-computed weight vector and can perform a single matrix multiplication.

For example, the network inputs can belong to three non-overlapping slices. The system can pre-compute three weight vectors for the three slices to which a network input can possibly belong, e.g., by computing $W+W_1$, $W+W_2$, and $W+W_3$. At inference time, when receiving a network input that belongs to slice 2, instead of having the overhead of an additional matrix multiplication $W_2X$, the system can select the pre-computed $W+W_2$ and can perform a single matrix multiplication $(W+W_2)X$.

When the embedding 306, the intervention 312, and the reactivity class 310 are received for processing by the dynamic decoder 308, the dynamic decoder 308 can identify the particular reactivity class of the plurality of reactivity classes to which the reactivity class input 310 belongs. In some implementations, the dynamic decoder can set a slice indicator according to the reactivity class 310 and the slice indicator can be used to automatically select the dynamic parameters for the reactivity class 310.

For example, for the "fully reactive" class, the dynamic decoder 308 can process the embedding 306 using (i) the set of shared parameters of the dynamic decoder, (ii) the respective set of class parameters for the "fully reactive" class, but not (iii) the respective sets of class parameters for any other classes in the plurality of the reactivity classes, e.g., the "slow reactivity" and the "no reactivity" classes.

The dynamic decoder 308 can have low latency on-board the autonomous vehicle during inference and the predicted conditional probability distribution 314 can be computed efficiently. When dynamic biases are used in the slice parameters of the dynamic decoder, the system only needs to add an additional bias for the identified reactivity class. When dynamic weights are used in the slice parameters of the dynamic decoder, the system can pre-compute a weight vector for the identified reactivity class, e.g., by computing a sum of the shared weights and the weights for the reactivity class. During inference onboard the autonomous vehicle, instead of having the overhead of an additional matrix multiplication, the system can select the pre-computed weight vector and can perform a single matrix multiplication.

In some implementations, the dynamic decoder may need less memory than having separate decoders for each class of the reactivity classes. The dynamic decoder may need less memory on-board the autonomous vehicle to store the parameters for the machine learning model. Let S be the number of shared parameters in the dynamic decoder, M be the number of reactivity classes, and R be the number of class parameters for each reactivity class. The total number of parameters that need to be stored on-board the autonomous vehicle is S+M*R for a dynamic decoder. If separate decoders are used instead, the total number of parameters that need to be stored on-board the autonomous vehicle can be M(S+R).

The predicted conditional probability distribution 314 includes a predicted probability distribution for each of a plurality of possible trajectories of the agent. The plurality of possible trajectories for the agent can include possible trajectories of the agent over a future period of time. In some implementations, the plurality of possible trajectories for the agent can include a sequence of heat-maps over a future time period, and the sequence of heat-maps can indicate predicted locations of the agent over the future time period.

For example, the predicted conditional probability distribution 314 can include: a driving forward trajectory with a probability 0.3, a lane change trajectory with a probability 0.4, and a stopping trajectory with a probability 0.3. The sum of the trajectory probabilities is 1.0. The predicted trajectory can describe the locations and speeds of the agent at a plurality of possible future time points.

The conditional behavior prediction model 300 can be trained on labeled training data by a training system, e.g., the training system 110 of FIG. 1. The training data can include a plurality of training examples, and each training example can include an input 302 characterizing a scene that includes the agent and the vehicle, and a ground truth behavior label 316. The ground truth behavior label 316 can be obtained from a driving log of the vehicle, indicating what the agent did in the future. The ground truth behavior label 316 can include a ground truth behavior class and a ground truth trajectory of the agent.

The training examples can be sliced or grouped based on a ground truth reactivity label. The ground truth reactivity label can be obtained in a similar way as described for the ground truth reactivity label 212 of FIG. 2. The conditional behavior prediction model 300, including the dynamic decoder 308, can be trained using the ground truth reactivity slicing based on the ground truth reactivity label. That is, the set of shared parameters of the dynamic decoder 308 (and the encoder 304) can be trained on all the training examples, and each set of class parameters of the dynamic decoder 308 for a reactivity class can be trained on the slice of the training examples with a ground truth reactivity label that belongs to the reactivity class. The dynamic decoder 308 can process the intervention 312 using one or more layers (e.g., attention layers, recurrent layers, followed by fully connected layers) to generate an embedding of the intervention 312. The dynamic decoder 208 can further process the embedding of the intervention 312 and the embedding 306 using the dynamic parameters of the dynamic decoder 308. In some implementations, during the training of the conditional behavior prediction model 300, the intervention 312 can be a ground-truth future intervention (e.g., a ground truth trajectory, action, geometry, speed, or a combination of these) of the autonomous vehicle that the system can obtain from the driving log of the autonomous vehicle.

The training system can train the conditional behavior prediction model 300 on labeled training data using supervised learning. The training system can train the conditional behavior prediction model 300 based on a loss function 318 that measures a difference between the predicted conditional probability distribution 314 and the ground truth behavior label 316. The loss function can include a classification loss, a regression loss, or both of them. The classification loss can measure the difference between the predicted probability distribution over the behavior classes and the ground truth behavior class included in the ground truth behavior label 316. The regression loss can measure the difference between the predicted trajectories (e.g., locations at one or more future time steps) and a ground truth trajectory included in the ground truth behavior label 316. In particular, the training system can generate updated model parameter values for the shared parameters of the dynamic decoder 308 based on the gradient of the loss function. The training system can also generate, based on the gradient of the loss function, updated model parameter values of the set of class parameters for the reactivity class to which a reactivity class input 310 belongs. For any set of class parameters corresponding to a given reactivity class, the contribution to the gradient is zero from all training inputs that do not belong to the given reactivity class. Thus, the set of slice parameters for the given reactivity class are updated using only the training inputs in the given reactivity class. For example, when a training input in the batch belongs to reactivity class 1, the training engine can generate updated model parameter values for the set of slice parameters (1) for reactivity class 1 and the updated model parameter values for the shared parameters. Therefore, the respective set of class parameters can be trained to learn the features of the training inputs that belong to each reactivity class.

The training system generates updated model parameter values for the conditional behavior prediction model 300 by using an appropriate updating technique, e.g., stochastic gradient descent with backpropagation. The training system can then update the collection of model parameter values of the conditional behavior prediction model 300 using the updated model parameter values.

In some implementations, the conditional behavior prediction model 300 can be a part of a marginal behavior prediction (BP) model that predicts a probability distribution of possible trajectories for the agent without conditioning on an action of the vehicle or an intervention of the vehicle. An encoder can be shared between the marginal BP model and the conditional behavior prediction model 300. In some implementations, the encoder can be trained using both the loss for the model 300 and the loss for the marginal BP model. In some implementations, the encoder can be pre-trained using the loss for the marginal BP model, and the parameters of the encoder can be fixed so that only the dynamic decoder 308 of the model 300 is trained using the loss for the model 300. The dynamic decoder 308 can be trained to process an embedding generated from the encoder that is shared with the marginal BP model and to generate the predicted conditional probability distribution 314 conditioned on the reactivity class 310 and the intervention 312.

In some implementations, an encoder can be shared between the conditional behavior prediction model 300 and the reactivity prediction model 200. In some implementations, the encoder can be trained using both the loss for the model 200 and the loss for the model 300. In some implementations, the encoder can be pre-trained using the loss for the model 200, and the parameters of the encoder can be fixed so that only the dynamic decoder 308 of the model 300 is trained using the loss for the model 300. In some implementations, the encoder can be pre-trained using the loss for the model 300, and the parameters of the encoder can be fixed so that only the classifier 206 of the model 200 is trained using the loss for the model 200. In some implementations, an encoder can be a part of a marginal behavior prediction (BP) model, and can be shared between the conditional behavior prediction model 300, the reactivity prediction model 200, and the marginal BP model.

Once trained, the conditional behavior prediction model 300 can be used to generate a plurality of predicted conditional probability distributions, e.g., Pr(Agent Prediction|intervention, Reactivity=r), for a plurality of reactivity classes. The system can generate an intervention behavior prediction based on the plurality of predicted conditional probability distribution and the reactivity distribution, e.g., as described above in equation (2).

In some implementations, the system can implement the summation of equation (2) efficiently. For example, because different reactivity classes 310 have the same embedding 306, the system can cache the embedding 306, and can generate the predicted conditional probability distribution 314 for different reactivity classes in a single batch. Thus, the system does not need to compute the embedding 306 for each reactivity class. The system can compute the intervention behavior prediction with the result from the batch. This efficient implementation can be used during the training and during the inference of the conditional behavior prediction model 300. In some implementations, the system can generate the predicted conditional probability distribution 314 for the different reactivity classes in parallel.

For example, the system can process each input example using the encoder to generate an embedding of the input example. The system can generate M versions of each training example and M is the number of reactivity classes of the reactivity variable. For example, for M=2 and two input examples, the system can create the following examples:

Example 1 reactive: [x1, x2, x3, reactive],
Example 1 non-reactive: [x1, x2, x3, un-reactive],
Example 2 reactive: [x4, x5, x6, reactive], and
Example 2 non-reactive: [x4, x5, x6, un-reactive].

Here, [x1, x2, x3] can be the embedding vector of the first input example and [x4, x5, x6] can be the embedding vector for the second input example. The system can arrange these training examples into a single batch and can present the single batch of training examples to the dynamic decoder 308. For example, the single batch of the training example can be:

[
[x1, x2, x3, reactive],
[x1, x2, x3, un-reactive],
[x4, x5, x6, reactive],
[x4, x5, x6, un-reactive],
]

The system can process each example in the batch in parallel.

Figure 4:
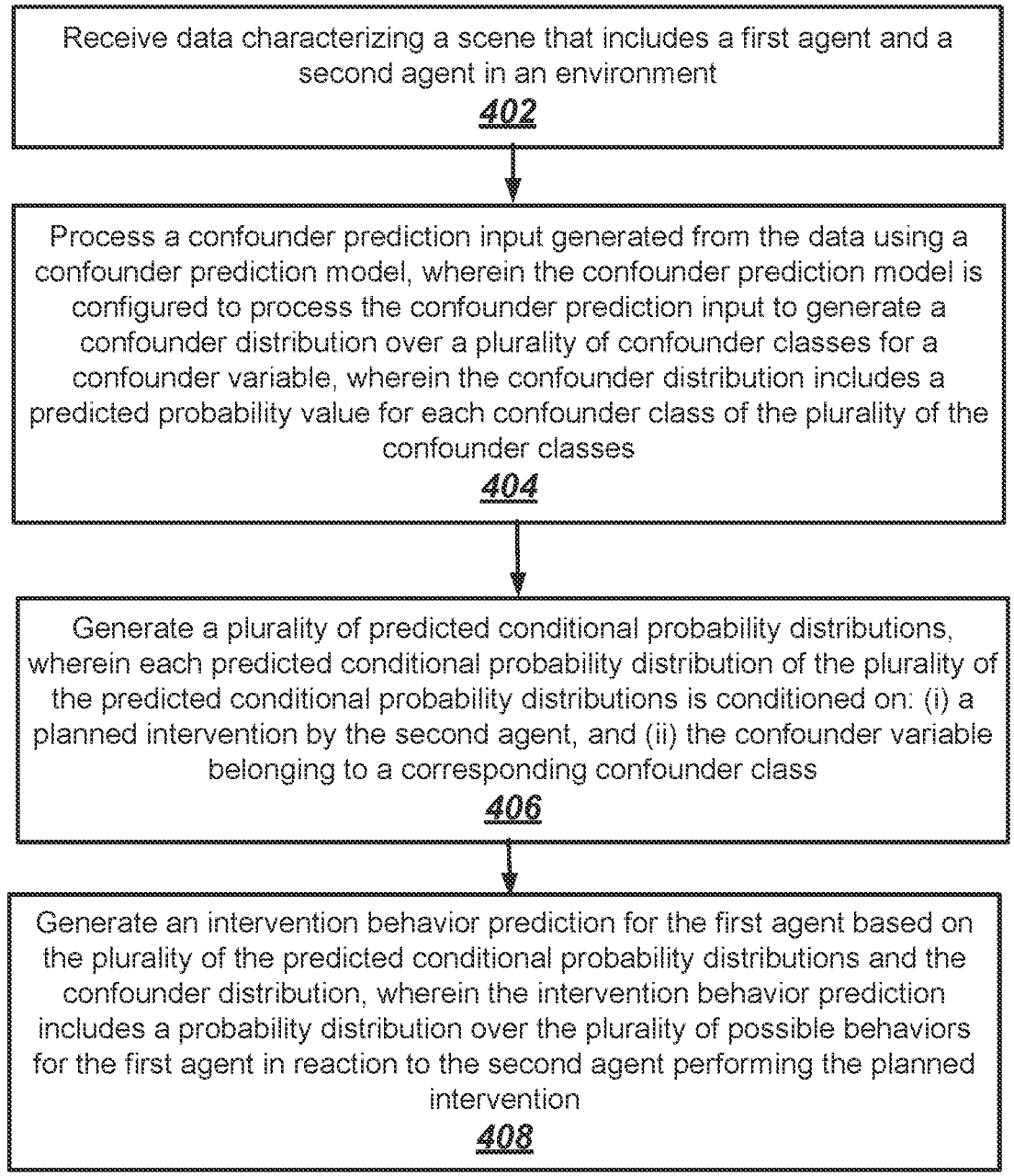
FIG. 4 is a flow chart of an example process for intervention behavior prediction.

FIG. 4 is a flow chart of an example process 400 for intervention behavior prediction. The example process in FIG. 4 uses a forward inference pass through a confounder prediction model and a conditional behavior prediction model that have already been trained or is being trained to generate a prediction error for predicted probability distribution. The example process or a part of the process can thus be used during training or to make predictions from unlabeled input, e.g., in a production system. The process will be described as being performed by an appropriately programmed machine learning system, such as the on-board system 120 or the training system 110 of FIG. 1.

The system receives data characterizing a scene that includes a first agent and a second agent in an environment (402). In some implementations, the second agent can be an autonomous vehicle, the first agent can be a road-user that is in the same environment as the autonomous vehicle. In some implementations, the system can receive an intervention query from a planning subsystem when the planning subsystem is planning a few possible actions for the autonomous vehicle. The intervention query can include a question asking what a nearby agent might react if the autonomous vehicle follows a certain action.

The system processes a confounder prediction input generated from the data using a confounder prediction model (404). The confounder prediction model is configured to receive the confounder prediction input and to process the confounder prediction input to generate a confounder distribution over a plurality of confounder classes for a confounder variable. The confounder distribution includes a predicted probability value for each confounder class of the plurality of the confounder classes.

In some implementations, the confounder variable can include a characteristic variable of the first agent, a characteristic variable of the environment, a respective characteristic variable of one or more other agents in the environment, or a combination of these. In some implementations, the confounder variable of the first agent can include a reactivity of the first agent to the second agent. The confounder distribution can include reactivity distribution over a plurality of reactivity classes for the reactivity of the first agent to the second agent. In some implementations, the confounder variable can include one or more of the following: an agent's reactivity, awareness, intent, or driving style, a future state of the environment (e.g., a future state of a traffic light), or both. In some implementations, the confounder variable can include an agent's future reactivity, future awareness, future intent, etc, during a future period of time. In some implementations, the confounder variable can be a single characteristic variable, e.g., reactivity of the agent.

In some implementations, the confounder variable can be a multi-dimensional variable that includes two or more characteristics, e.g., reactivity and intent, or awareness and driving style. The confounder prediction model can be configured to generate a joint distribution for the multi-dimensional variable. For example, a probability included in a joint distribution for a multi-dimensional confounder variable (e.g., including awareness, intent, and driving style) can be Pr(Awareness=1, intent=pass, driving style=aggressive) =0.2. In some implementations, the variables of the multi-dimensional confounder variable can be independent. The system can separately compute a respective probability distribution of each variable. The system can compute the joint distribution by multiplying the independent probability distributions of the variables.

The system generates a plurality of predicted conditional probability distributions (406). Each predicted conditional probability distribution of the plurality of the predicted conditional probability distributions is conditioned on: (i) a planned intervention by the second agent, and (ii) the confounder variable belonging to a corresponding confounder class.

In some implementations, generating the plurality of predicted conditional probability distributions includes: for each confounder class, processing an intervention input using a conditional behavior prediction model. The intervention input can be generated from the data characterizing a scene that includes the first agent and the second agent, the confounder variable belonging to the corresponding confounder class, and the planned intervention by the second agent. The conditional behavior prediction model can be configured to receive the intervention input and to process the intervention input to generate a respective predicted conditional probability distribution over a plurality of possible behaviors for the first agent.

In some implementations, the conditional behavior prediction model can include a dynamic decoder that has (i) a set of shared parameters and (ii) a respective set of class parameters for each of the plurality of the confounder classes. For each confounder class, the system can receive an embedding input to the dynamic decoder, and the system can process the embedding input using (i) the set of shared parameters of the dynamic decoder, (ii) the respective set of class parameters for the confounder class, but not (iii) the respective sets of class parameters for any other classes in the plurality of the confounder classes. In some implementations, the system can generate the embedding input by processing an input generated from the data characterizing a scene that includes the first agent and the second agent using an encoder.

In some implementations, the confounder variable can be a multi-dimensional variable that includes two or more characteristics, e.g., reactivity and intent, or awareness and driving style. The system can have a different index for each combination of the multi-dimensional variable (e.g., for each combination of reactivity, awareness, intent, and driving style), and the system can include a dynamic decoder that can use the respective set of class parameters based on the index.

In some implementations, the conditional behavior prediction model can include a separate decoder for each confounder class of the plurality of the confounder classes. For example, the conditional behavior prediction model can include a decoder for a "reactive" class, and a decoder for a "not reactive" class.

The system generates an intervention behavior prediction for the first agent based on the plurality of the predicted conditional probability distributions and the confounder distribution (408). The intervention behavior prediction includes a probability distribution over the plurality of the possible behaviors for the first agent in reaction to the second agent performing the planned intervention.

In some implementations, the system can obtain, for each confounder class, the respective predicted conditional probability distribution that is conditioned on the confounder variable belonging to the confounder class. The system can compute, for each confounder class, a product of the respective predicted conditional probability distribution and the predicted probability value for the confounder class. The system can compute a sum of the products over the plurality of the confounder classes, and the sum can be the intervention behavior prediction for the first agent.

In some implementations, because an agent's reactivity can change over time, the system can compute the reactivity distribution at a predetermined time interval, e.g., every planner or behavior prediction cycle. Correspondingly, the system can compute the plurality of predicted conditional probability distributions at a predetermined time interval, e.g., every planner or behavior prediction cycle. Thus, the system can compute the intervention behavior prediction at a predetermined time interval, e.g., every planner or behavior prediction cycle, and can provide periodically updated response to an intervention query that requests what an agent might react if an autonomous vehicle follows a certain action or plan.

In some implementations, the system can generate a planned trajectory for the second agent using the intervention behavior prediction for the first agent. For example, the system can generate a planned trajectory for an autonomous vehicle using the IBP for a nearby agent.

In some implementations, the system can obtain a plurality of planned interventions by the second agent. For each planned intervention of the plurality of planned interventions, the system can compute a respective intervention behavior prediction for the first agent in reaction to the second agent performing the planned intervention. The system can generate a planned trajectory for the second agent by comparing the intervention behavior predictions corresponding to the plurality of planned interventions.

For example, the system can obtain a first planned intervention by the second agent. The system can compute a first intervention behavior prediction for the first agent in reaction to the second agent performing the first planned intervention. The system can obtain a second planned intervention by the second agent. The system can compute a second intervention behavior prediction for the first agent in reaction to the second agent performing the second planned intervention. The system can generate a planned trajectory for the second agent by comparing the first intervention behavior prediction and the second intervention behavior prediction.

In some implementations, the system can generate the respective intervention behavior predictions corresponding to the plurality of planned intervention in parallel or in sequence. For example, a planning subsystem can predict N different possible plans that an autonomous vehicle might do in the current context. The system can generate N intervention behavior predictions for those N plans in parallel. The planning subsystem can use the N intervention behavior predictions to refine or update its plans. In some implementations, the planning subsystem can generate M updated plans, and can query the system with the M updated plans. The system can generate M intervention behavior predictions for the M updated plans.

For example, the system can generate a first IBP for an agent in reaction to a planned yielding action of an autonomous vehicle. The system can generate a second IBP for the agent in reaction to a planned passing action of the autonomous vehicle. The system can compare the agent's predicted behavior distributions in the first IBP and the second IBP. Based on that, the system can determine a planned action for the autonomous vehicle, e.g., yielding to the agent if that is safer for the agent.

In some implementations, there may exist multiple agents in the vicinity of an autonomous vehicle, and the multiple agents may respond to an intervention of the autonomous vehicle. The system can predict the IBP for each agent in the environment, given the context information of the environment and the navigation history of the multiple agents. In some implementations, the system can include a separate IBP model for each agent. The system can implicitly generate a marginal behavior prediction over the interactions of one agent with other agents. The system can decompose the multiple agents IBP into multiple per agent IBP. The multiple per agent IBP can be computed independently and taking into account information of other agents in their respective inputs. For example, for multiple agents 1, ..., N and an autonomous vehicle invention, the system can decompose Pr(Agent 1 behavior prediction, ... Agent N behavior prediction|Do (autonomous vehicle intervention)) as Pr(Agent 1 behavior prediction|Do (autonomous vehicle intervention)), ..., Pr(Agent N behavior prediction|Do (autonomous vehicle intervention)).

In some implementations, if an agent's behavior is independent of another agent's behavior and is only impacted by the autonomous vehicle's behavior, the system can use the example process 400 to compute a separate intervention behavior prediction for each agent of the multiple agents. In some implementations, if one agent's behavior can be affected by another agent's behavior, the confounder variable can include an aggregation of future variables of the multiple agents and a variable state of the environment, e.g., future reactivities of each agent, future traffic light, future awareness of each agent, etc. The system can compute a confounder distribution for the confounder variable, and can compute the intervention behavior prediction using the example process 400. For example, for multiple agents 1, ..., N and an autonomous vehicle invention, the system can compute Pr(Agent 1 behavior prediction, ..., Agent N behavior prediction|Do (autonomous vehicle intervention)) using the example process 400. The dynamic decoder 308 can generate a joint distribution of the conditional probability distribution over the multiple agents 1, ..., N.

In some implementations, the reactivity prediction model and the conditional behavior prediction model can share an encoder that generates an embedding from data characterizing a scene that includes the first agent and the second agent in the environment. In some implementations, there may exist multiple agents in the vicinity of an autonomous vehicle and the multiple agents may respond to an intervention of the autonomous vehicle. A global encoder can be configured to receive data characterizing a scene that includes the multiple agents and the autonomous vehicle in the environment and to generate a respective embedding each of the multiple agents. The respective embedding for each agent can be used to generate the reactivity distribution and the predicted conditional probability distributions for each agent, and to generate the IBP for each agent. In some implementations, the conditional behavior prediction model can include a dynamic decoder that can process the respective embeddings of the multiple agents in a batch based on each confounder class of the plurality of confounder classes.

For example, the reactivity classes can include a "reactive" class and a "not reactive" class. The system can batch process the embeddings for five agents in the vicinity of the autonomous vehicle to generate the predicted conditional probability distributions for the "reactive" class by using the set of parameters of the dynamic decoder for the "reactive" class. The system can batch process the embeddings for the five agents to generate the predicted conditional probability distributions for the "not reactive" class by using the set of parameters of the dynamic decoder for the "not reactive" class.

In some implementations, the system can generate the intervention behavior prediction incrementally to maintain the temporal causality between the vehicle's intervention and the agent's reactivity. Instead of providing the entire planned intervention to the conditional behavior prediction model up front, the system can provide the vehicle's planned intervention gradually in sequence as the agent's behavior is predicted, e.g., as a sequence of actions or trajectory segments revealed one at a time while making corresponding predictions of the agent's behavior or reaction given the revealed sequence of actions or trajectory segments so far.

For example, the planned intervention can be a lane change action. The system can provide a first action (e.g., slowing down or speeding up) of the planned intervention over a first period of time T0 to T1 to the conditional behavior prediction model, and the system can generate a first intervention prediction for the agent over the first period from T0 to T1. The system can provide a second action (e.g., moving towards the left lane) of the planned intervention over a second period of time T1 to T2 to the conditional behavior prediction model, and the system can generate a second intervention prediction for the agent over the second period from T1 to T2. In this way, the system can avoid the situation where the system makes an intervention behavior prediction at an earlier period of time based on the entire planned intervention.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving data characterizing a scene that includes a first agent and a second agent in an environment;
   processing a confounder prediction input generated from the data using a confounder prediction model, wherein the confounder prediction model is configured to receive the confounder prediction input and to process the confounder prediction input to generate a confounder distribution over a plurality of confounder classes for a confounder variable, wherein the confounder distribution comprises a predicted probability value for each confounder class of the plurality of the confounder classes;
   generating a plurality of predicted conditional probability distributions, wherein each predicted conditional probability distribution of the plurality of the predicted conditional probability distributions is conditioned on: (i) a planned intervention by the second agent, and (ii) the confounder variable belonging to a corresponding confounder class, the generating comprises:
      for each confounder class, processing an intervention input generated from the data characterizing the scene that includes the first agent and the second agent, the planned intervention by the second agent using a conditional behavior prediction model, and the confounder variable belonging to the corresponding confounder class, wherein the conditional behavior prediction model is configured to receive the intervention input and to process the intervention input to generate a respective predicted conditional probability distribution over a plurality of possible behaviors for the first agent; and
   generating an intervention behavior prediction for the first agent based on the plurality of the predicted conditional probability distributions and the confounder distribution, wherein the intervention behavior prediction comprises a probability distribution over the plurality of the possible behaviors for the first agent in reaction to the second agent performing the planned intervention.

2. The method of claim 1, wherein the confounder variable comprises a reactivity of the first agent to the second agent, the confounder distribution comprises reactivity distribution over a plurality of reactivity classes for the reactivity of the first agent to the second agent.

3. The method of claim 1, wherein the second agent is an autonomous vehicle, the first agent is a road-user that is in a same environment as the autonomous vehicle.

4. The method of claim 1, wherein the conditional behavior prediction model comprises a dynamic decoder that has (i) a set of shared parameters and (ii) a respective set of class parameters for each of the plurality of the confounder classes, and wherein for each confounder class, the processing the intervention input using the conditional behavior prediction model comprises:
   receiving an embedding input to the dynamic decoder; and
   processing the embedding input using (i) the set of shared parameters of the dynamic decoder, (ii) the respective set of class parameters for the confounder class, but not (iii) the respective sets of class parameters for any other classes in the plurality of the confounder classes.

5. The method of claim 4, comprising:
   generating the embedding input by processing an input generated from the data characterizing the scene that includes the first agent and the second agent using an encoder.

6. The method of claim 1, wherein the conditional behavior prediction model comprises a separate decoder for each confounder class of the plurality of the confounder classes.

7. The method of claim 1, wherein generating the intervention behavior prediction for the first agent based on the plurality of the predicted conditional probability distributions and the confounder distribution comprises:
for each confounder class,
obtaining the respective predicted conditional probability distribution that is conditioned on the confounder variable belonging to the confounder class, and
computing a product of the respective predicted conditional probability distribution and the predicted probability value for the confounder class; and
computing a sum of the products over the plurality of the confounder classes, wherein the sum is the intervention behavior prediction for the first agent.

8. The method of claim 1, further comprising:
obtaining a plurality of planned interventions by the second agent;
for each planned intervention of the plurality of planned interventions, computing a respective intervention behavior prediction for the first agent in reaction to the second agent performing the planned intervention; and
generating a planned trajectory for the second agent by comparing the intervention behavior predictions corresponding to the plurality of planned interventions.

9. The method of claim 1, further comprising:
generating a planned trajectory for the second agent using the intervention behavior prediction for the first agent.

10. The method of claim 1, wherein the confounder variable comprises a characteristic variable of the first agent.

11. The method of claim 1, wherein the confounder variable comprises a characteristic variable of the environment.

12. The method of claim 1, wherein the confounder variable comprises a respective characteristic variable of one or more other agents in the environment.

13. A system comprising one or more computers and one or more storage devices storing instructions that when executed by the one or more computers cause the one or more computers to perform operations comprising:
receiving data characterizing a scene that includes a first agent and a second agent in an environment;
processing a confounder prediction input generated from the data using a confounder prediction model, wherein the confounder prediction model is configured to receive the confounder prediction input and to process the confounder prediction input to generate a confounder distribution over a plurality of confounder classes for a confounder variable, wherein the confounder distribution comprises a predicted probability value for each confounder class of the plurality of the confounder classes;
generating a plurality of predicted conditional probability distributions, wherein each predicted conditional probability distribution of the plurality of the predicted conditional probability distributions is conditioned on:
(i) a planned intervention by the second agent, and (ii) the confounder variable belonging to a corresponding confounder class, the generating comprises:
for each confounder class, processing an intervention input generated from the data characterizing the scene that includes the first agent and the second agent, the planned intervention by the second agent using a conditional behavior prediction model, and the confounder variable belonging to the corresponding confounder class, wherein the conditional behavior prediction model is configured to receive the intervention input and to process the intervention input to generate a respective predicted conditional probability distribution over a plurality of possible behaviors for the first agent; and
generating an intervention behavior prediction for the first agent based on the plurality of the predicted conditional probability distributions and the confounder distribution, wherein the intervention behavior prediction comprises a probability distribution over the plurality of the possible behaviors for the first agent in reaction to the second agent performing the planned intervention.

14. The system of claim 13, wherein the confounder variable comprises a reactivity of the first agent to the second agent, the confounder distribution comprises reactivity distribution over a plurality of reactivity classes for the reactivity of the first agent to the second agent.

15. The system of claim 13, wherein the second agent is an autonomous vehicle, the first agent is a road-user that is in a same environment as the autonomous vehicle.

16. The system of claim 13, wherein the conditional behavior prediction model comprises a dynamic decoder that has (i) a set of shared parameters and (ii) a respective set of class parameters for each of the plurality of the confounder classes, and wherein for each confounder class, the processing the intervention input using the conditional behavior prediction model comprises:
receiving an embedding input to the dynamic decoder; and
processing the embedding input using (i) the set of shared parameters of the dynamic decoder, (ii) the respective set of class parameters for the confounder class, but not (iii) the respective sets of class parameters for any other classes in the plurality of the confounder classes.

17. The system of claim 16, the operations comprise:
generating the embedding input by processing an input generated from the data characterizing the scene that includes the first agent and the second agent using an encoder.

18. The system of claim 13, wherein the conditional behavior prediction model comprises a separate decoder for each confounder class of the plurality of the confounder classes.

19. The system of claim 13, wherein generating the intervention behavior prediction for the first agent based on the plurality of the predicted conditional probability distributions and the confounder distribution comprises:
for each confounder class,
obtaining the respective predicted conditional probability distribution that is conditioned on the confounder variable belonging to the confounder class, and
computing a product of the respective predicted conditional probability distribution and the predicted probability value for the confounder class; and
computing a sum of the products over the plurality of the confounder classes, wherein the sum is the intervention behavior prediction for the first agent.

20. One or more non-transitory computer-readable storage media storing instructions that when executed by one or more computers cause the one or more computers to perform operations comprising:
receiving data characterizing a scene that includes a first agent and a second agent in an environment;
processing a confounder prediction input generated from the data using a confounder prediction model, wherein the confounder prediction model is configured to receive the confounder prediction input and to process the confounder prediction input to generate a confounder distribution over a plurality of confounder classes for a confounder variable, wherein the confounder distribution comprises a predicted probability value for each confounder class of the plurality of the confounder classes;

generating a plurality of predicted conditional probability distributions, wherein each predicted conditional probability distribution of the plurality of the predicted conditional probability distributions is conditioned on: (i) a planned intervention by the second agent, and (ii) the confounder variable belonging to a corresponding confounder class, the generating comprises:

for each confounder class, processing an intervention input generated from the data characterizing the scene that includes the first agent and the second agent, the planned intervention by the second agent using a conditional behavior prediction model, and the confounder variable belonging to the corresponding confounder class, wherein the conditional behavior prediction model is configured to receive the intervention input and to process the intervention input to generate a respective predicted conditional probability distribution over a plurality of possible behaviors for the first agent; and generating an intervention behavior prediction for the first agent based on the plurality of the predicted conditional probability distributions and the confounder distribution, wherein the intervention behavior prediction comprises a probability distribution over the plurality of the possible behaviors for the first agent in reaction to the second agent performing the planned intervention.

* * * * *